May 11, 1965     H. J. SCHWERDHÖFER     3,182,529
DUAL-SPEED HUB
Filed May 22, 1963     2 Sheets-Sheet 1
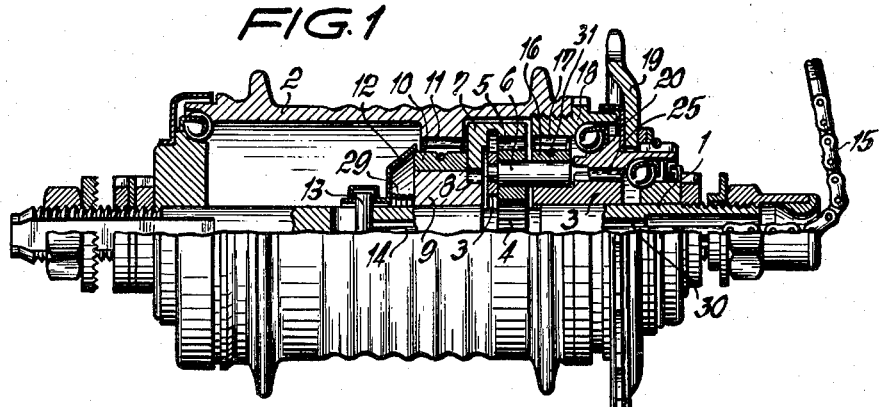
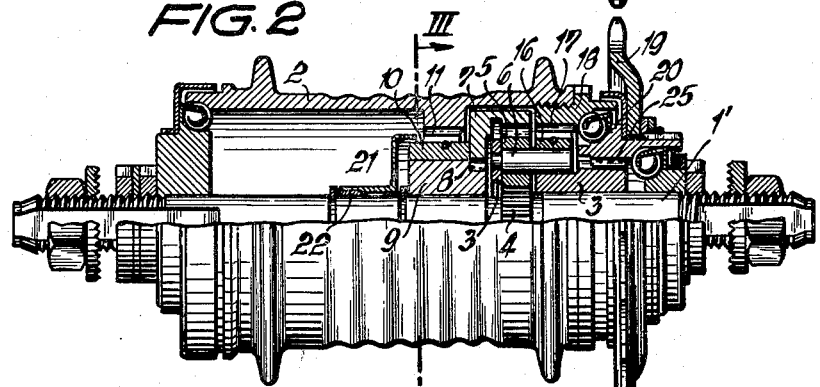
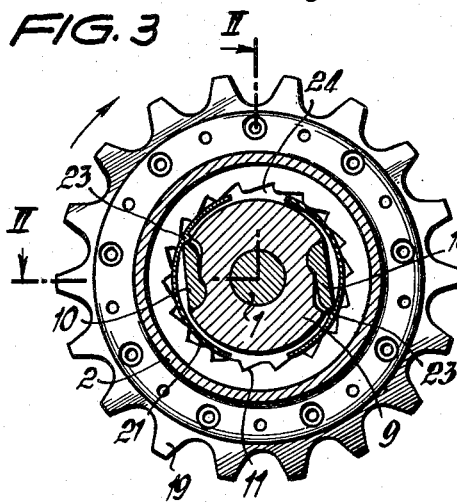
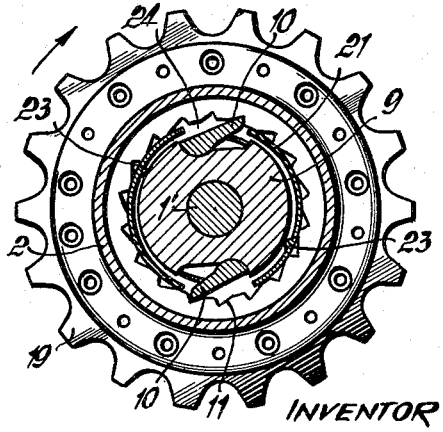
INVENTOR
Hans Joachim Schwerdhöfer
By Richard Clod
Agt May 11, 1965 H. J. SCHWERDHÖFER 3,182,529
DUAL-SPEED HUB
Filed May 22, 1963 2 Sheets-Sheet 2

INVENTOR
Hans Joachim Schwerdhöfer

United States Patent Office 3,182,529
Patented May 11, 1965

3,182,529
DUAL-SPEED HUB
Hans Joachim Schwerdhöfer, Schweinfurt (Main), Germany, assignor to Fichtel & Sachs A.G., Schweinfurt (Main), Germany, a corporation of Germany
Filed May 22, 1963, Ser. No. 282,286
Claims priority, application Germany, May 25, 1962, F 36,910
10 Claims. (Cl. 74—750)

This invention relates to multiple-speed hubs for bicycles and like vehicles, and is more particularly concerned with a dual-speed hub in which the transmission ratio between the input member of the hub and the hub shell carrying the wheel rim may be selected by the operator.

Multiple speed hubs for bicycles are commonly built to provide either two or three transmission ratios. Conventional two-speed hubs include so much of the structure of the usual three-speed hubs, or are otherwise so complex that the conventional two-speed hubs offer little economic advantage over the more versatile three-speed hub.

The principal object of this invention is the provision of a two-speed hub which has relatively few operating parts and is therefore capable of being manufactured at relatively low cost.

Another object is the provision of a hub the dual speed transmission of which can be arranged in a hub shell of relatively small diameter and short axial length. The reduced dimensions of the hub of the invention further contribute to savings in labor and material.

A more specific object is the avoidance of motion transmitting members interposed between the input member on the shaft and the hub shell which must be moved axially during shifting from one speed to another.

With these and other objects in view, the invention in one of its aspects resides in an improved on the basically known multiple speed hub in which a hub shell is arranged for rotation about the axis of a normally stationary shaft, a driver member is mounted on the shaft for rotation about the axis thereof, and a planetary gear transmission arranged in the hub shell is interposed between the driver member and the hub shell, the transmission including a sun gear fixed on the shaft, a ring gear rotatable about the shaft axis, and several planet gears mounted on a rotatable planet carrier for simultaneous meshing engagement with the sun gear and ring gear in a plane of engagement which is radial with respect to the shaft axis.

In the hub of this invention, the driver member is spaced from the afore-mentioned radial plane toward the drive end of the hub, that is, the end at which a drive sprocket is normally mounted. The planet carrier of the transmission engages the driver member for joint rotation therewith so that the ring gear rotates faster than the planet carrier during rotation of the driver member. One free-wheeling coupling is axially interposed between the plane of engagement of the planetary gear transmission and the driver member, and connects the planet carrier with the hub shell. Another free-wheeling coupling is axially spaced from the plane of engagement in a direction away from the drive end of the hub, and connects the ring gear with the hub shell. Operator controlled means are provided for disengaging the last mentioned coupling.

Other features and many of the attendant advantages of this invention will be readily appreciated as the same becomes better understood by reference to the following detailed description when considered in connection with the accompanying drawings wherein:

FIG. 1 shows a dual-speed hub of the invention in side elevation and partially in axial section;

FIG. 2 shows a modified dual-speed hub in a view corresponding to that of FIG. 1, as indicated by the section line II—II in FIG. 3;

FIG. 3 illustrates the hub of FIG. 2 in radial section on line III—III;

FIG. 4 shows the device of FIG. 3 in a different operational position;

Figure 5:
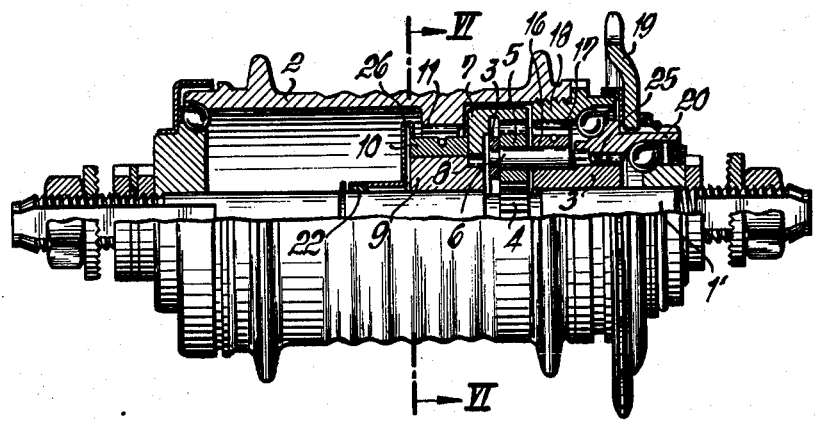
FIG. 5 shows yet another modification of the hub of FIG. 1 in a corresponding view.

Referring now to the drawing in detail, and initially to FIG. 1, there is shown a bicycle hub of generally conventional external appearance. The other elements of the hub are mounted on a stationary shaft 1 which has an axial cavity 30. A hub shell 2 supports the wheel rim by means of wire spokes in a manner entirely conventional and therefore not illustrated. The hub shell 2 is arranged for rotation about the axis of the shaft 1 as is usual.

A driver member 20 fixedly connected with a drive sprocket 19 at the drive end of the hub is rotatably mounted on the shaft 1 and engages the planet carrier 3 of a planetary gear transmission which also includes a sun gear 4 integral with the shaft 1, several planet gears 5 of which only one is visible in the drawing, and a ring gear 7. The planet gears 5 which are mounted on respective planet shafts 6 on the planet carrier 3 simultaneously mesh with the sun gear 4 and the ring gear 7, whereby the rotary speed of the ring gear 7 in the common plane of engagement of the several gears is higher than the rotary speed of the planet carrier 3.

Motion is transmitted from the driver member 20 to the planetary gear transmission by means of engaged teeth 8 on the driver member and on the planet carrier 3 which facilitate assembly of the hub, but normally fixedly connect the driver member and the planet carrier. Motion is further transmitted selectively from the planetary gear transmission to the hub shell 2 by one of two free-wheeling couplings.

The first coupling is positioned axially between the driver member 20 and the plane of engagement of the transmission gear. It includes two pawls 16 pivotally mounted on the planet carrier 3 for movement in a radial plane toward and away from a position of engagement with an internal ratchet rim 17 on a bearing member 18 which is fixedly attached to the hub shell 2. A wire spring 31 urges the pawls 16, of which one only is seen in FIG. 1, toward the position of engagement.

The second free-wheeling coupling consists of a pawl carrier 9 rotatably mounted on the shaft 1, and connected with the ring gear 7 for joint rotation by interengaging teeth 8 which permit more convenient assembly. Two spring loaded pawls 10 on the carrier 9 are pivotable in a radial plane toward and away from an internal ratchet rim 11 on the inner face of the hub shell 2. The second coupling is spaced from the plane of gear engagement in a direction away from the drive end of the hub.

A control member 12 of sheet metal has a central portion formed with an opening engaged by the shaft 1. The peripheral portion of the control member 12 has the shape of the hollow frustum of a cone. In the position illustrated in FIG. 1, the conical portion of the control member 12 engages an edge of the sole pawl 10 visible in the figure, and is urged to move away from the pawl by a helical compression spring 29 axially interposed between the control member 12 and the pawl carrier 9.

A block 13 is axially slidable in an axial slot of the shaft 2 and engages a groove in the control member 12. The block 13 is attached to a link chain 15 by a pull rod 14 which is axially slidable in the cavity 30. The chain 15 extends axially outward of the cavity 30 for connection with a speed shifting lever on the frame or handlebars of the bicycle in a conventional manner.

The axial positions of all elements of the hub other than the control member 12 and its actuating mechanism are secured by the mounting of the shell 2 on suitable bearings, and by axial abutment of the several hub elements against each other, as is evident from FIG. 1. The spring 29 assists in holding the elements of the planetary transmission in fixed radial planes.

The afore-described dual-speed hub operates as follows:

In its illustrated blocking position, the control member 12 is held by the chain 15 against axial movement away from the drive end of the hub under the force of the spring 29. The pressure exerted by the conical internal face of the control member 12 on the pawls 10 holds the pawls away from the ratchet rim 11.

Power is transmitted from the drive sprocket 19 to the hub shell 2 by means of the driver member 20, the planet carrier 3, the pawls 16, and the bearing member 18. The hub shell 2 rotates at the same speed as the sprocket 19. The planet gears 5, the ring gear 7, the pawl carrier 9, and associated elements rotate idly.

When the tension of the chain 15 is relaxed, the control member 12 is shifted axially away from the drive end of the hub, and out of engagement with the pawls 10 by the combined force of the compression spring 29 and of the pawl spring associated with the pawls 10. The control member 12 releases the pawls 10 which are thereupon pivoted by their spring into engagement with the ratchet rim 11 on the hub shell 2.

Power is then transmitted from the drive sprocket 19 to the hub shell 2 by means of the driver member 20, the planet carrier 3, the planet gears 5, the ring gear 7, the pawl carrier 9, and the other elements of the second coupling, namely the pawls 10 and the ratchet rim 11. The hub shell 2 rotates at the speed of the ring gear which is higher than that of the planet carrier 3. The ratchet rim 17 on the bearing member 18 overtravels the pawls 16 on the planet carrier 3, and the first free-wheeling coupling is ineffective.

When it is desired to shift from the non-illustrated high-speed position of the hub to the low-speed position shown in FIG. 1, the chain 15 is tightened in a conventional manner against the resistance of the spring 29 until the control member 12 deflects the pawls 10 from engagement with the ratchet rim 11, whereupon power transmission is taken over by the first coupling 16, 17.

The dual-speed hub of the invention illustrated in FIGS. 2, 3, and 4 is closely similar to that shown in FIG. 1, and corresponding elements of the second embodiment are designated by identical reference numerals. The stationary shaft 1' shown in FIGS. 2, 3, 4 lacks an axial cavity, but is otherwise closely similar to the shaft 1. The planetary gear transmission shown in FIG. 2 is identical with that illustrated in FIG. 1, and the pawl carrier 9 carries pawls 10 which cooperate with a ratchet rim 11 in a manner evident from the preceding description of FIG. 1.

The hub shown in FIGS. 2, 3, and 4 differs from the first-described embodiment of the invention by control means which change the transmission ratio of the hub responsive to back pedaling by the operator, and to the ensuing backward rotation of the drive sprocket 19 and of the planetary transmission.

A control sleeve 21 of stepped cylindrical shape is rotatably mounted on the portion of the shaft 1' which extends from the pawl carrier 9 in a direction away from the drive end of the hub. As better seen in FIGS. 3 and 4, the wider cylindrical portion of the sleeve 21 has two diametrically opposite recesses 24 which extend axially inward from the circular edge of the sleeve 21. In the blocking position of the sleeve 21 illustrated in FIG. 3, the recesses 24 are offset approximately 90° from the two pawls 10 which are also mounted diametrically opposite each other on the pawl carrier 9. The two portions of the control sleeve 21 between the recesses 24 are interposed between the pawls 10 and the ratchet rim 11, and prevent engagement between the coupling members. Internal radial projections on these sleeve portions circumferentially engage the tips of the pawls 10.

In the pawl releasing position of the control sleeve 21 illustrated in FIG. 4, the pawls 10 are circumferentially aligned with the recesses 24, and are free to extend radially outward through the recesses under the pressure of their pawl spring into driving engagement with the ratchet rim 11. Movement of the control sleeve 21 between the blocking and the releasing position is actuated by a brake spring 22 which is fastened to the central portion of the control sleeve 21 and frictionally engages the shaft 1'. The spring 22 has the shape of an open ring smaller in diameter than the shaft 1' when in the relaxed condition, and arranged in such a manner that it is tightened when the pawl carrier 9 rotates in a direction opposite to the arrows in FIGS. 3 and 4 during back pedaling.

The embodiment of the invention illustrated in FIGS. 2, 3, and 4 operates as follows:

In the blocking position of the control sleeve 21 shown in FIG. 3, the second coupling is inoperative, and the hub shell 2 is rotated by the first coupling 16, 17 at the speed of the drive sprocket 19 in the manner described above. The control sleeve 21 rotates idly with the pawl carrier 9 at the higher speed of the ring gear 7 because of the engagement of the radial projections 23 with the pawl tips. The pawls are thereby held out of alignment with the recesses 24.

When it is desired to shift to the higher transmission ratio, the drive sprocket 19 is briefly turned backward by back pedaling. The pawl carrier 9 is thereby rotated in a direction opposite to the arrows in FIG. 3 while the control sleeve 21 is braked to a standstill by the spring 22. The pawls 10 move counterclockwise away from the radial projections 23 until they are aligned with the recesses 24 as shown in FIG. 4. When forward pedaling is now resumed, the pawls 10 engage the ratchet rim 11, and the hub shell 2 is rotated at the speed of the ring gear 7.

When the hub is to be shifted from the high-speed position shown in FIG. 4 to the slow-speed position of FIG. 3, the pawl carrier 9 is again moved counterclockwise, as viewed in FIG. 4, by back pedaling. An edge of each recess 24 in the control sleeve 21 cammingly engages the projecting portion of a pawl 10, and causes the pawl to be retracted until it is disengaged from the ratchet rim 11. Further back pedaling shifts the pawls relative to the control sleeve 21 until the pawl tips pass the radial projections 23, whereupon the resumed forward pedaling causes engagement between pawls and projections, and the sleeve rotates with the pawls. The proper relationship between the restraining forces of the brake spring 22 and of the pawl spring will be obvious to those skilled in the art for any particular set of conditions.

Figure 6:
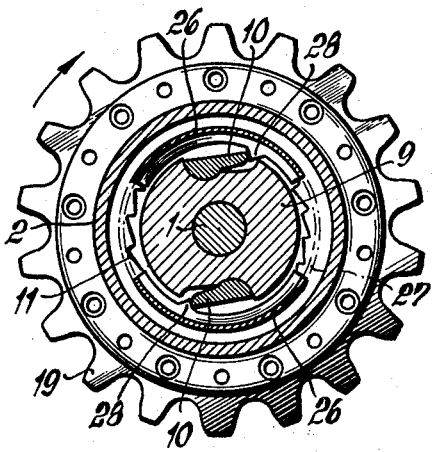
FIG. 6 is a radially sectional view of the hub of FIG. 5, the section being taken on the line VI—VI.
Figure 7:
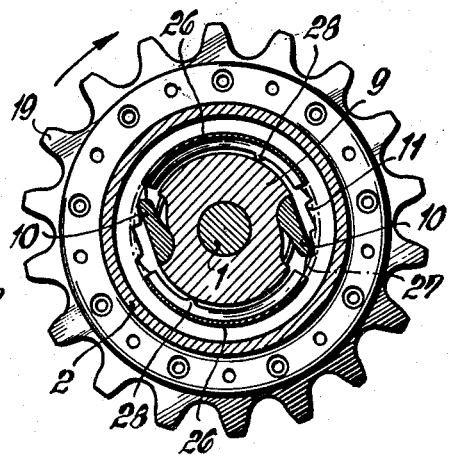
FIG. 7 illustrates the hub of FIG. 6 in a different operational position.

The embodiment of the invention illustrated in FIGS. 5, 6, and 7 in views corresponding respectively to those of FIGS. 2, 3, and 4 is a dual-speed hub in which a change in transmission ratio is brought about by back-pedalling in the manner described hereinabove. The hub of FIGS. 5, 6, and 7 is closely similar to that of FIGS. 2, 3, and 4, and differs from the latter in details of the operator controlled means for disengaging the second coupling.

The control element 26 employed for pivoting the pawls 10 is a disk having a cylindrical central hub which rotatably engages the shaft 1' and carries the brake spring 22. The peripheral rim of the disk 26 is turned over inward as best seen in FIG. 5, and the two layers of sheet metal in two diametrically opposite rim portions are cut out to provide recesses 27 through which the pawls 10 may extend radially outward into engagement with the ratchet rim 11 in the manner described in connection with FIGS. 2, 3, and 4. Radial projections 28 on the disk 26 engage the tips of the pawls 10 in the blocking position of the control disk 26 as shown in FIG. 6 for preventing alignment between the pawls 10 and the recesses 27 as has been described above.

The dual-speed hub of the invention utilizes the available space within a rather slim hub shell 2 to best advantage because of the arrangement of the two free-wheeling couplings one of which is axially interposed between the plane of engagement of the gears and the driver member 20, whereas the other one is spaced from the plane of engagement in a direction away from the drive end.

Shifting between the two speeds or transmission ratios of which the several hubs illustrated are capable is achieved with any axial movement of a member of the motion-transmitting train which connects the drive sprocket 19 with the hub shell 2. Wear of such motion transmitting members is unavoidably caused by their axial shifting during speed changes in known multiple speed hubs, and is avoided by the instant invention, thus permitting the hub to the assembled from lighter elements. The durability of the hub is not affected by wear of motion transmitting members during speed changes, and such wear need not be taken into account in designing the dual speed hub of the invention. The hub therefore is lighter and smaller in size than otherwise comparable conventional hubs.

The number of moving parts in my hub is small, and they have simple shapes which are readily formed by conventional methods. Most dimensions are non-critical, and relatively wide tolerances are the rule rather than the exception. The hub of the invention may therefore be mass-produced at low cost without loss of performance.

It should be understood, of course, that the foregoing disclosure relates to only a preferred embodiment of the invention, and that it is intended to cover all changes and modifications of the examples of the invention herein chosen for the purpose of the disclosure which do not constitute departures from the spirit and scope of the invention set forth in the appended claims.

What is claimed is:

1. A dual-speed hub for a bicycle and the like comprising, in combination:
   (a) a normally stationary shaft having an axis;
   (b) a hub shell rotatable about said axis;
   (c) a driver member mounted on said shaft for rotation about said axis; and
   (d) a planetary gear transmission interposed in said hub shell between said driver member and said hub shell, said transmission including
      (1) a sun gear fixed on said shaft and defining a radial plane relative to said axis, said driver member being axially spaced from said plane in a predetermined direction;
      (2) a planet carrier engaging said driver member for joint rotation therewith about said axis;
      (3) a ring gear rotatable about said axis;
      (4) a planet gear rotatable on said planet carrier in said plane in simultaneous meshing engagement with said sun gear and said ring gear, whereby the rotary speed of said ring gear is higher than the rotary speed of said planet carrier during rotation of said driver member;
      (5) a first free-wheeling coupling interposed between said planet carrier and said hub shell, said first coupling being axially positioned between said plane and said driver member;
      (6) a second free-wheeling coupling interposed between said ring gear and said hub shell, said second coupling being axially spaced from said plane in a direction opposite to said predetermined direction; and
   (e) operator controlled means for selectively disengaging said second coupling.

2. A hub as set forth in claim 1, wherein said second coupling includes a ratchet member and a pawl member, and said operator controlled means include means for pivotally moving said pawl member in a plane radial with respect to said shaft toward and away from a position of driving engagement with said ratchet member.

3. A hub as set forth in claim 2, wherein said operator controlled means include a control member having an annular conical face about said axis, said face being engageable with said pawl member, and actuating means for actuating axial movement of said control member.

4. A hub as set forth in claim 3, wherein said actuating means include an actuating member, said shaft being formed with an axial cavity, and said actuating member being axially movable in said cavity and connected to said control member for joint movement therewith, and a motion transmitting member secured to said actuating member and axially extending outward of said cavity.

5. A hub as set forth in claim 2, wherein said operator controlled means include a control element rotatable about said axis in a forward and backward direction, said control element having a circumferential portion formed with a recess therein, said control element when rotated relative to said second coupling being movable between a blocking position in which said circumferential portion is interposed between said pawl member and ratchet member, and a releasing position in which said recess is aligned with said pawl member for passage of said pawl member through said recess into engagement with said ratchet member; and brake means for resisting rotation of said control element in said backward direction.

6. A hub as set forth in claim 5, wherein said recess is axially open, said circumferential portion having a face opposite said axis, said face engaging said pawl member when said control element is in said blocking position thereof, and said recess being circumferentially aligned with said pawl member in said releasing position of said control element.

7. A hub as set forth in claim 5, said circumferential portion carrying cam means engageable with said pawl member in the blocking position of said control element for pivoting said pawl member out of engagement with said ratchet member.

8. A hub as set forth in claim 5, wherein said control element has a central portion formed with an opening, said shaft engaging said opening.

9. A hub as set forth in claim 5, wherein said brake means includes resilient friction means interposed between said shaft and said control element.

10. A hub as set forth in claim 1, further comprising means for axially securing said hub shell, said driver member, said gears, said planet carrier, and said couplings on said shaft.

No references cited.

DON A. WAITE, *Primary Examiner.*